United States Patent [19]

Wheaton

[11] Patent Number: 4,781,894
[45] Date of Patent: Nov. 1, 1988

[54] CONTROL MECHANISM FOR DELIVERY OF GAS PRODUCT AT CONSTANT PRESSURE

[76] Inventor: Jeffrey C. Wheaton, P.O. Box 2362, Binghamton, N.Y. 13910

[21] Appl. No.: 23,153

[22] Filed: Mar. 9, 1987

[51] Int. Cl.⁴ .................. G05D 9/00; G05D 16/12
[52] U.S. Cl. .................... 422/106; 137/397; 137/577; 422/111; 422/112
[58] Field of Search .............. 48/61, 87, 111, 197 A; 137/397, 398, 577; 422/106, 110, 111, 112, 113; 222/66

[56] References Cited

U.S. PATENT DOCUMENTS

| | | | |
|---|---|---|---|
| Re. 27,929 | 2/1974 | Von Sturm et al. | 422/113 |
| 663,623 | 12/1900 | Cameron et al. | 48/61 |
| 2,516,934 | 8/1950 | Weaver | 48/61 |
| 2,814,303 | 11/1957 | Fifer | 137/577 |
| 3,418,232 | 12/1968 | Emery | 137/577 |
| 3,787,186 | 1/1974 | Geres | 422/113 |

Primary Examiner—Kenneth M. Schor
Assistant Examiner—Joye L. Woodard
Attorney, Agent, or Firm—Ralph R. Barnard

[57] ABSTRACT

A float controlled mechanism designed to allow the storage in and removal of variable amounts of gaseous reaction product from a reaction vessel of fixed size at a fixed pressure. The control mechanism uses a float to sense the level of the liquid in the vessel and maintain a fixed head of liquid above this level thereby maintaining a fixed pressure in the sealed reaction vessel.

5 Claims, 1 Drawing Sheet

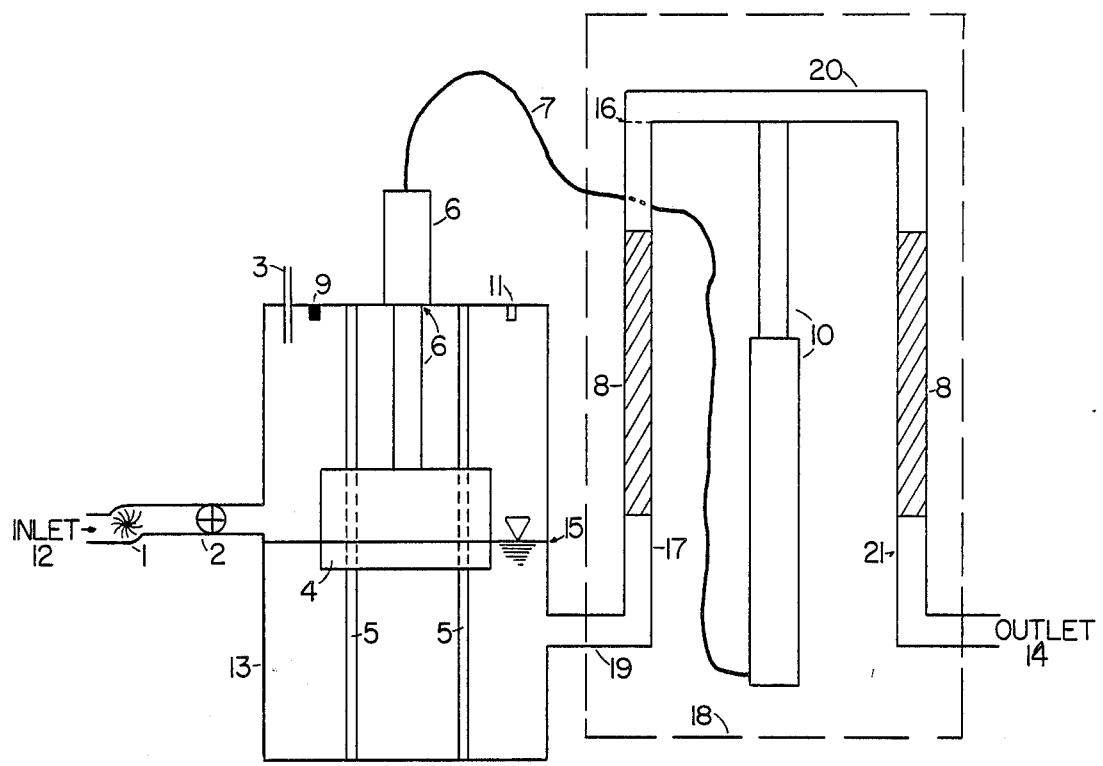

CONTROL MECHANISM FOR DELIVERY OF GAS PRODUCT AT CONSTANT PRESSURE

BACKGROUND OF THE INVENTION

This invention pertains to devices and methods of collecting, storing, and dispensing gas at a constant pressure.

It is often desired to collect the gas produced by a chemical reaction. It may also be necessary to maintain the gas pressure within a limited range for the reaction to proceed properly. In any event, maintaining a relatively constant gas pressure greatly facilitates the storage and dispensing of the produced gas. Constant pressure enables a constant flow rate to be maintained when gas is drawn out of the system.

DESCRIPTION OF RELATED ART

Previous methods for maintaining a constant gas pressure in a partially liquid filled reaction vessel fall into two categories. The most useful method delivers the generated gas at a constant pressure, has a constant liquid capacity, and a varying capacity for gas storage. This method of capturing gas and maintaining an airtight environment consists of inverting a container and floating it on the liquid surface. The weight of the floating vessel controls the pressure inside the vessel. Some provision must also be made to assure that movement is only made vertically to prevent the sides of the two vessels from binding.

There are a number of disadvantages with this method. The fit between the two vessels must be very precise, and this precision can be quite expensive in a large rugged container. The structure is confined to vertical growth for increased capacity. Finally, because the pressure is controlled by the weight of the floating vessel and area is a squared function, the pressure obtainable is limited by the practical limits on the weight of the container. Cameron et al., U.S. Pat. No. 663,623 (1900), used this method to regulate gas pressure. They regulated the weight of a separate storage vessel and did not use an extendable column attached to the same vessel that generated the gas.

The other major method involves enclosing the liquid and the product of the reaction (the gas) in a pressure vessel of fixed dimensions with inlet and outlet ports for the liquid at the bottom of the container but with the pipes connected to the liquid ports traveling above the container. Gas is released through a gas outlet at the top of the container. As the amount of generated gas increases, the pressure inside the vessel increases and the amount of liquid decreases. This system is simpler and allows the storage of varying amounts of gas; however, it delivers the gas at varying pressures which limits the applications for which it is suitable.

It is therefore the object of this invention to store variable quantities of gas at a constant pressure.

Also of interest is Fifer, U.S. Pat. No. 2,814,303 (1957), which has a variable height outflow mechanism, but is concerned only with delivering liquids at a constant flow rate and not gases.

SUMMARY OF THE INVENTION

This invention presents a means of capturing, storing, and releasing at a constant pressure, gas produced in a pressurized reaction vessel of fixed volume. A float driven piston is used to sense the liquid level in a reaction vessel and drive a second piston that maintains the height of a column of liquid on the liquid outlet thereby maintaining a constant head of pressure on the reaction vessel as a whole.

BRIEF DESCRIPTION OF THE DRAWINGS

The FIGURE shows a diagram of the invention.

DESCRIPTION OF PREFERRED EMBODIMENTS

The FIGURE shows a reaction vessel (13) utilizing the invention. A liquid reagent mixture is introduced to the vessel from an inlet source (12) by a means for producing pressure (1), e.g. a pump or reservoir of liquid at a higher level feeding by gravity and controlled by a valve, through a check valve (2) or other device to prevent liquid or gas from backflowing out of the vessel.

The vessel (13) has a gas outlet (3) placed above the liquid reagent through which gas can be released. In the vessel is a float assembly (4), preferably stabilized by control rods (5) that limit the float's movement to the vertical plane. The float is attached to an actuating hydraulic cylinder (6) which converts the buoyant force of the float to hydraulic pressure. Liquid moves out of the vessel through the vessel liquid outlet (19) into a variable height outlet apparatus (18) and when the pressure in the vessel is too high, finally flows out the outlet apparatus' outlet (14) under the influence of gravity.

The variable height outlet apparatus (18) maintains the desired constant pressure in the reaction vessel. The vessel's liquid outlet port (19) is connected to an ascending vertical extensible column (17) which is preferably attached to a horizontally mounted tube (20) and then to a descending vertical extensible column (21) which is finally connected to the whole system's liquid outlet (14). The hydraulic pressure generated in the actuating hydraulic cylinder (6) is transmitted through a hydraulic control line (7) to the responding hydraulic cylinder (10). The lower end of the responding hydraulic cylinder is firmly attached to the ground or other stable substrate and the top of the cylinder's piston is attached to the horizontally mounted tube (20) which connects the ascending and descending extensible columns (17 and 21). The pistons are sized such as to translate one unit of float movement into one unit of columnar extension or contraction in the same direction as the float has moved. The amount of extension on both columns must be large enough to maintain the appropriate pressure over the entire storage range of the vessel. The hatching (8) of columns (17) and (21) is to indicate that these columns are functionally variable in height, (ie. extensible). The columns need not actually extend or change in length as long as the height of the column of liquid may be varied (a flexible hose of constant length would serve if its maximum height were varied).

The vessel also has an inlet cutoff switch (9) to prevent the overfilling of the vessel with liquid that would result in liquid entering the gas lines and a pressure switch (11) which turns the inlet means on to add more liquid when pressure in the vessel drops below the minimum.

This system stores varying amounts of produced gas at a fixed pressure. A constant head is maintained by the variable height outlet apparatus (18) by maintaining the difference between the height (16) of the liquid in the ascending arm (column) (17), of the outlet apparatus

(17) (18) and the lower liquid level (15) in the vessel (13). The height (16) of the liquid in the ascending outlet column (17) above the liquid level in the vessel (13) is adjusted by the responding hydraulic cylinder (10) driven by the hydraulic pressure created by the actuating hydraulic cylinder (6) via the connecting line (7).

The inlet means provides the initial pressure, and thereafter pressure is maintained within system limits by maintaining a column of liquid of constant height above the liquid level in the reaction vessel.

The float (4) moves in response to the level of liquid in the vessel (13) automatically adjusting the level of the column of liquid (16) in the ascending column of the variable height outlet apparatus (17), which in turn maintains the differential between the two levels, which thus maintains constant pressure. When the gas is drawn off faster than it is produced, the pressure sensor switch (11) triggers the liquid input means to add more liquid until the pressure is in the required range. The float will then move upward with the liquid level in the vessel, raising the height of the column of liquid in the ascending arm of the output apparatus.

If gas is produced faster than it is consumed, the volume of stored gas increases and the new gas displaces some of the liquid in the vessel. This liquid flows over the top of the ascending arm of the variable height output apparatus where the liquid flows down the descending column of the outlet apparatus in response to gravity and out of the outlet (14). This loss of liquid from the vessel lowers the liquid level in the vessel. This lowers the float, which in turn drops the height of the ascending arm of the variable height outlet apparatus, and once again maintains a constant pressure.

At the maximum liquid level (minimum gas volume) the float trips the input means cutoff switch (9) which prevents liquid from being forced into the gas lines. Alternatively, the cutoff switch (9) could directly sense liquid level. This situation would arise after a prolonged period of gas withdrawal exceeding gas production.

At the minimum liquid level (maximum gas storage) the float is restricted from lower movement by the location of the vessel's liquid outlet port (19). Those skilled in the art will recognize that the cylinder must be long enough to travel between the minimum and maximum float positions. Continued production of gas beyond the maximum storage will result in excess gas bubbling out of the liquid outlet.

These two extremes and the approaches to them are buffered by a negative feedback mechanism in the sense that as more gas is stored, less gas producing liquid is present and as more gas is used, more gas producing liquid is present. The liquid level cannot drop below that of the liquid outlet port, and as such neither may the float.

The delivered pressure can be adjusted by resetting the pressure at which the pump switch (11) trips the pump and by changing the amount of hydraulic fluid in the control mechanism. The pressure at which the gas is supplied is a function of the weight of the liquid and the height of the column of liquid above the liquid level in the reaction vessel. The pressure may be calculated using the equation:

$$\text{Pressure} = \text{density} \times \text{gravity} \times \text{head}$$

(where density is the mass per unit voume of the liquid in the variable height outlet apparatus, gravity is the acceleration of gravity, and head is the difference in liquid level between the vessel and the variable height outlet apparatus).

It is understood that the embodiments of the invention herein described are merely illustrative of the application of the principles of the invention. Reference herein to the details of the illustrative embodiments are not intended to limit the scope of the claims which themselves recite those features regarded as essential to the invention.

I claim:

1. A float controlled system for delivery of a gaseous product at a controlled constant pressure, comprising:

a. a sealed reaction vessel for producing a gaseous product from a gas producing liquid having a liquid inlet provided with inlet control means for introducing a gas producing liquid under pressure into the vessel, a liquid outlet, a gas outlet for a gaseous product located above the liquid inlet, and a pressure sensor means located in the vessel above the liquid inlet for sensing gas pressure therein and controlling the inlet control means so that the gas producing liquid is introduced when a sensed gas pressure is below a predetermined desired pressure;

b. a variable height liquid outlet means comprising a vertically mounted extendable tube having an upper end and a lower end connected to the liquid outlet of the reaction vessel, and a means for vertically moving the upper end of the extendable tube for varying the height of said extendable tube;

c. a float located in the reaction vessel for floating on the liquid therein and having a sensing means for sensing vertical movement of the float; and d. a control means responsive to a sensed vertical movement of the float for translating the sensed movement of the float to the means for vertically moving the upper end of the extendable tube in an amount equal to and in the same direction as the sensed vertical movement of the float so that a liquid head created between a liquid level in the extendable tube and the liquid in the reaction vessel remains constant and thereby controlling the gas pressure in the reaction vessel at a constant pressure for delivery therefrom.

2. The system of claim 1 in which:

a. the means for moving the upper end of the extendable tube is a first hydraulic cylinder having a hydraulic fluid port for introduction of hydraulic fluid to move a piston attached to the upper end of the extendable tube, whereby the hydraulic fluid pressure in the cylinder acts to change the effective height of the tube;

b. the means for sensing vertical movement of the float is a second hydraulic cylinder mounted on top of the reaction vessel having a piston attached to the float and a hydraulic fluid port for introduction of hydraulic fluid; and c. said control means comprises a connection between the hydraulic fluid port of the second cylinder and the hydraulic fluid port of the first cylinder.

3. The system of claim 2, further comprising guide means for constraining the float to move only in the vertical plane.

4. The system of claim 2, further comprising a liquid level detector located in said vessel for activating the inlet control means and stopping liquid introduction into the vessel.

5. The system of claim 4, in which the liquid level detector is activated by contact with the float.

* * * * *